United States Patent [19]

McCormick

[11] 4,269,379
[45] May 26, 1981

[54] PANEL-FIXING CABLE TIE

[75] Inventor: Mathew McCormick, East Didsbury, England

[73] Assignee: Bowthorpe-Hellermann Limited, Crawley, England

[21] Appl. No.: 46,194

[22] Filed: Jun. 6, 1979

[30] Foreign Application Priority Data

Jun. 30, 1978 [GB] United Kingdom ............... 28494/78
Mar. 13, 1979 [GB] United Kingdom ................. 8893/79

[51] Int. Cl.³ ............................................. F16L 3/08
[52] U.S. Cl. .................................... 248/73; 24/16 PB; 248/74 PB
[58] Field of Search .............. 248/74 PB, 74 R, 73; 24/16 PB, 73 PB, 73 SA, 17 AP, 30.5 P; 268, 206 A, 73 PF

[56] References Cited

U.S. PATENT DOCUMENTS

| 3,581,347 | 6/1971 | Verspieren | 248/74 PB |
| 3,667,710 | 6/1972 | Moody et al. | 248/74 PB X |
| 3,744,096 | 7/1973 | Kok | 24/16 PB |
| 3,819,139 | 6/1974 | Jemison | 24/16 PB X |

FOREIGN PATENT DOCUMENTS

| 2300731 | 7/1973 | Fed. Rep. of Germany | 248/74 PB |
| 2314640 | 12/1973 | Fed. Rep. of Germany | 248/74 PB |
| 2380456 | 8/1978 | France | 248/74 PB |
| 989984 | 4/1965 | United Kingdom . | |

*Primary Examiner*—J. Franklin Foss
*Attorney, Agent, or Firm*—Laubscher & Laubscher

[57] ABSTRACT

A one-piece synthetic plastic tie, for tying around a bundle of cables or the like and for securing the bundle to a panel, comprises a flexible elongate strap provided with a series of ratchet serrations (on its side lying against the bundle of cables) engaging with complementary teeth formed on a head at one end of the strap. In use, the free end of the strap is passed through a hole in the panel, around the cable bundle and back through the hole. When the free end of the strap is pulled tight, the head is pulled into the hole to wedge the strap against the periphery of the hole, the head teeth engaging the strap serrations to prevent withdrawal.

8 Claims, 8 Drawing Figures

PANEL-FIXING CABLE TIE

BACKGROUND OF THE INVENTION

This invention relates to a one-piece tie of synthetic plastic material for tying around a bundle of cables or the like and for securing that bundle to a panel.

SUMMARY OF THE INVENTION

In accordance with the invention, there is provided a one-piece tie of synthetic plastic material for tying around a bundle of cables or the like and for securing the bundle to a panel, comprising a flexible elongate strap provided with a series of transverse ratchet serrations, and a head at one end of the strap, the head being provided with a toothed pawl portion, the arrangement being such that the free end of the strap may be passed through a hole in the panel from one side of the panel, around a bundle of cables or the like on the opposite side of the panel and back through the hole with the strap serrations facing the pawl teeth and such that, upon then pulling the free end of the strap tight, the toothed pawl portion will enter the hole and engage the strap serrations, the pawl teeth and strap serrations being profiled so as to permit the strap to be moved relative to the pawl in the direction tightening the strap about the bundle of cable or the like, the strap becoming increasingly wedged between the pawl portion and the periphery of the hole.

It will be noted that use of this tie eliminates the need for nuts, bolts or other means of fixing to the panel.

BRIEF DESCRIPTION OF THE FIGURES

Embodiments of this invention will now be described, by way of examples only, with reference to the accompanying drawings, in which.

DETAILED DESCRIPTION

Figure 1:
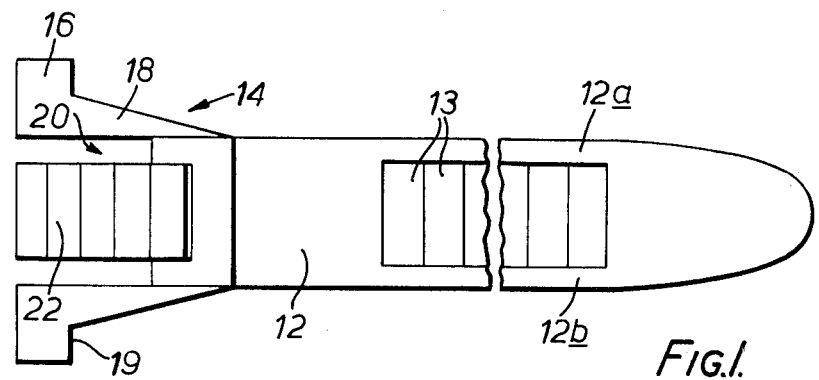
FIG. 1 is a top plan view of a tie in accordance with the invention.
Figure 2:
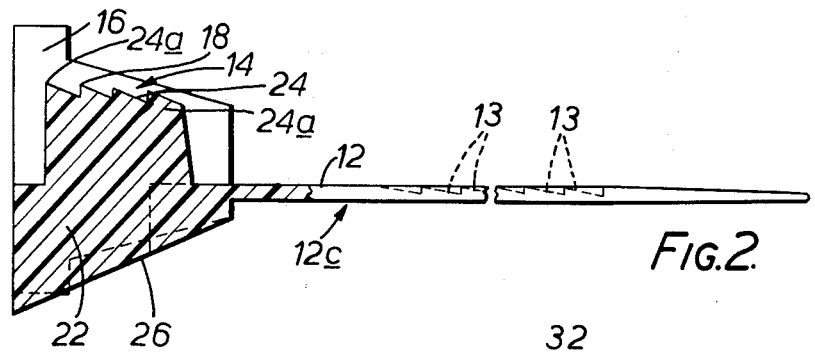
FIG. 2 is a side view of the tie of FIG. 1, shown with the nearer cheek portion of the head removed in order to show details of a pawl portion of the tie.
Figures 3, 4:
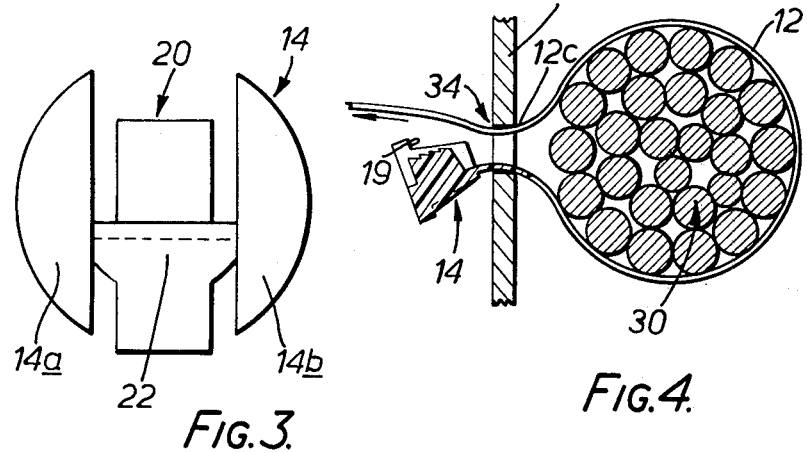
FIG. 3 is an end view of the tie.
FIG. 4 is a section through a panel to which a bundle of cables is being secured using the tie, the tie being shown with the nearer cheek portion removed.

Referring to FIGS. 1-4 of the drawings, there is shown a one-piece tie of synthetic material comprising a flexible elongate strap 12 provided with a series of transverse ratchet serrations 13 on one side thereof and with a head 14 at one end thereof. The head 14 can be seen to comprise an annular end portion 16 connected to the strap by a frusto-conical portion 18, defining an annular seat 19 on the inner end of the annular end portion 16: however, a slot 20 is formed in the head, running transverse (in particular, perpendicular) to the plane of the strap and extending from the outer end of the head, the slot 20 having a width equal to the width of the strap 12. The slot extends as far as about half way along the frusto-conical portion, except above the serrated surface of the strap, where it extends fully from the outer end of the head to the lesser-diameter end of the frusto-conical portion. The head is thus divided by the slot 20 into two cheek portions 14a, 14b.

The head is further provided with a pawl portion 22 projecting from the end of the strap and disposed, with clearances, between the two cheek portions 14a, 14b. In cross-section, the pawl portion 22 is rectangular, extending transverse (in particular, perpendicular) to the plane of the strap. Above the plane of the strap, the pawl portion terminates mid-way through the annular end portion 16 of the head and is formed with an upper surface which is provided with a plurality of pawl teeth 24. The crests of the pawl teeth lie in a plane which is slightly inclined to the plane of the strap, the outermost pawl tooth 24a being further from the plane of the strap than the innermost pawl tooth 24d. Below the plane of the strap, the pawl portion terminates flush with the outer end surface of the annular portion 16 and is provided with a bottom surface 26 which is inclined to the plane of the strap generally in conformity with the surface of the frusto-conical portion 18.

The strap 12 is provided with marginal plain portions 12a, 12b which are flush with the crests of the serrations 13. The width of slot 20 is equal to the overall width of the strap 13, the width of the pawl portion teeth is slightly less than the width of the serrations across the strap and the clearances between the pawl portion and the respective cheek portions are equal to each other and slightly greater than the width of each plain marginal portion 12a, 12b.

In use, the tie may be used to tie together a bundle 30 of electric cables or the like and to tie this bundle to a panel 32, the panel being provided with a circular hole 34. The free end of the strap 12 is passed through the hole 34 in the panel 32 from one side of the panel, being the side opposite the side to which the bundle 30 is to be secured. Then the free end of the strap is passed around the bundle and back through the hole 34, with the serrated side of the strap facing inwardly against the bundle 30. The free end of the strap, now projecting through the hole 34 from the side of the panel on which the bundle is situated, is now pulled tight. As a result, the toothed pawl portion of the head enters the hole 34 and the pawl teeth will engage the strap serrations: it will be noted that the pawl teeth and strap serrations are complementarily profiled and directed so as to enable the strap to move in the direction shown by the arrow (the strap serrations riding over the pawl teeth) but, when engaged, prevent movement of the strap in the opposite (withdrawal) direction.

The strap has a natural thickness such that when the strap serrations are fully engaged with the pawl teeth, the strap projects above the surface of the frusto-conical portion of the head. Thus, as the free end of the strap is pulled tight, the strap 12 and surface 12c will become wedged between the pawl teeth and the periphery of the hole 34, the surface 12c and 26 being forced against diametrically opposite portions of the periphery of the hole 34. Increasing tension applied to the free end of the strap increasingly forces the heat into the hole 34 and increases the wedging effect to which the strap is subjected. The surface 26 may project proud of the surface of the frusto-conical portion of the head so that the frusto-conical surface engages the periphery of the hole to align the head, whilst engagement of the hole periphery with the surface 26 has the effect of pivoting the pawl portion about its junction with the strap to further effect the wedging action. The periphery of the hole may bite into the surface 26 in practice and the head may be generally deformed so that seat 19 may abut the panel although the diameter of the hole is less than the diameter of the larger end of the frusto-conical portion in its natural state (and may even be slightly smaller than the smaller end of the frusto-conical portion in its natural state).

Figure 5:
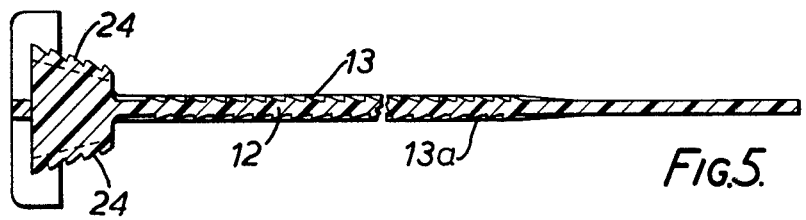
FIG. 5 is a side view of a second embodiment of tie.
Figure 6:
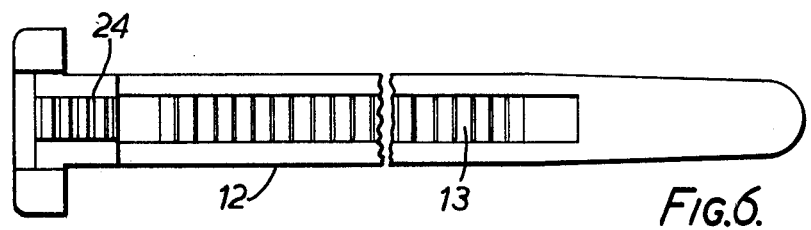
FIG. 6 is a top plan view of the tie shown in FIG. 5.
Figure 7:
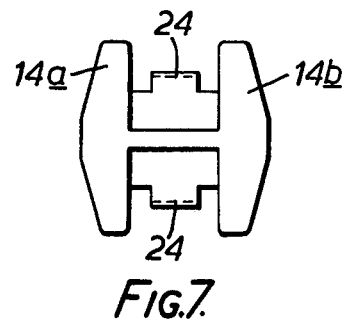
FIG. 7 is an end view of the tie of FIGS. 5 and 6.
Figure 8:
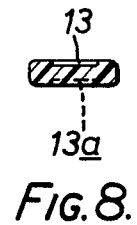
FIG. 8 is a section across the strap of the tie shown in FIGS. 5 to 7.

The tie shown in FIGS. 5 to 8 differs in that the flexible elongate strap 12 is provided with series of transverse ratchet serrations 13,13a on its opposite sides and the head 14 is provided with opposite series of pawl teeth 24,24A for engaging with the respective ratchet serrations 13,13a depending whether the strap is tied with its serrations 13,13a against the bundle of cables. The pawl teeth 24,24A are provided on diverging, opposite sides of the pawl which merges rigidly with the two cheek portions 14a,14b of the head. The pawl teeth project above the pawl surfaces on which they are formed so that the plain marginal portions 12b of the strap do not interfere with the pawl teeth.

In use, the free end of the strap is inserted through the aperture in the panel from the rear of the panel and is then tied, in either direction, around a bundle of cables at the front of the panel, and is passed back through the aperture and pulled tight. The ratchet serrations 13 or 13a engage with the pawl teeth 24 or 24A as in the case of the tie shown in FIGS. 1 to 4. It will thus be appreciated that the tie may be tied either way around the bundle, so that the person applying the tie does not have to check which way the tie is to be applied.

What is claimed is:

1. Tie means for connecting a bundle of cables to one side of a panel containing an opening, comprising a flexible elongated strap member (12) formed of synthetic plastic material, said strap member including
   (a) a horizontal flat body portion one horizontal surface of which contains a plurality of longitudinally extending serrations (13); and
   (b) an enlarged head portion (14) connected with one end of said body portion, said head portion including means defining a pawl portion (22) having upper and lower surfaces arranged above and below the horizontal axis of said body portion, that one of said pawl surfaces which is on the same side of the central axis of said body portion as said one serrated horizontal surface containing a plurality of longitudinally arranged pawl teeth (24) adapted for cooperation with said serrations, the other one of said pawl surfaces being inclined and converging toward said body portion, whereby when the other end of said body portion is introduced from the opposite side of the panel through the panel opening, circumferentially around the cable bundle, and back through the panel opening to cause the pawl teeth to be opposite said serrations, further tensioning of said other end of said strap portion causes said pawl portion to be drawn within said opening thereby to wedge said body portion between an edge of the panel opening and the pawl portion and to lock the serrations into engagement with the pawl teeth.

2. Tie means as defined in claim 1, wherein said one toothed pawl surface is inclined and converges toward said body portion.

3. Tie means as defined in claim 1 or 2, wherein the other horizontal surface of said body portion contains a plurality of longitudinally extending serrations, and further wherein the other of said inclined pawl surfaces contains a plurality of longitudinally arranged pawl teeth adapted to cooperate with said serrations in the other horizontal body portion surface, whereby said body portion may be passed circumferentially around the cable bundle in either direction.

4. Tie means as defined in claim 3, wherein said head portion further includes
   (1) a frusto-conical portion (18) converging toward said body portion; and
   (2) a transverse slot (20) within which said pawl portion is arranged.

5. Tie means for connecting a bundle of cables to one side of a panel containing an opening, comprising a flexible elongated strap member (12) formed of synthetic plastic material, said strap member including
   (a) a horizontal flat body portion one horizontal surface of which contains a plurality of longitudinally extending serrations (13); and
   (b) an enlarged head portion (14) connected with one end of said body portion, said head portion including means defining a pawl portion (22), that surface of the pawl portion on the same side of the central axis of said body portion as said serrated horizontal surface containing a plurality of longitudinally arranged pawl teeth (24) adapted for cooperation with said serrations, whereby when the other end of said body portion is introduced from the opposite side of the panel through the panel opening, circumferentially around the cable bundle, and back through the panel opening to cause the pawl teeth to be opposite said serrations, further tensioning of said other end of said strap portion causes said pawl portion to be drawn within said opening thereby to wedge said body portion between an edge of the panel opening and the pawl portion and to lock the serrations into engagement with the pawl teeth.

6. Tie means as defined in claim 5, wherein said toothed pawl surface is spaced from the central axis of, and converges in the direction of, said body portion.

7. Tie means as defined in claim 5 or 6, wherein said head portion further includes
   (1) a frusto-conical portion (18) converging toward said body portion; and
   (2) a transverse slot (20) within which said pawl portion is arranged.

8. Cable bundle tie means, comprising
   (a) means defining an opening; and
   (b) a flexible elongated strap member (12) formed of synthetic plastic material, said strap member including
      (1) a horizontal flat body portion the opposite horizontal surfaces of which each contain a plurality of longitudinally extending serrations (13); and
      (2) an enlarged head portion (14) connected with one end of said body portion, said head portion including means defining a pawl portion (22) having upper and lower pawl surfaces arranged above and and below the horizontal axis of said body portion, said pawl surfaces being relatively inclined at an acute angle and converging toward said body portion, both of said pawl surfaces containing a plurality of longitudinally arranged pawl teeth (24) adapted for cooperation with said serrations, whereby when the other end of said body portion is introduced from one side of the opening, circumferentially around the cable bundle, and back through the opening to cause the pawl teeth to be opposite said serrations, tensioning of said other end of said strap portion causes said pawl portion to be drawn within said opening to wedge the serrations of said body portion into engagement with the pawl teeth.

* * * * *